(12) United States Patent
Ishikawa (10) Patent No.: US 8,471,909 B2
(45) Date of Patent: Jun. 25, 2013

(54) DRIVING ASSISTANCE APPARATUS (75) Inventor: Takahiro Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 285 days.

(21) Appl. No.: 13/081,524

(22) Filed: Apr. 7, 2011

(65) Prior Publication Data

US 2011/0254956 A1    Oct. 20, 2011

(30) Foreign Application Priority Data

Apr. 19, 2010    (JP) .................................. 2010-96166

(51) Int. Cl.
*H04N 7/18*    (2006.01)
*G06K 9/00*    (2006.01)
*G09G 5/00*    (2006.01)

(52) U.S. Cl.
USPC ............................ 348/148; 382/103; 345/647

(58) Field of Classification Search
USPC ............................ 348/148; 345/647; 382/103
See application file for complete search history.

(56) References Cited

U.S. PATENT DOCUMENTS

| | | | |
|---|---|---|---|
| 2008/0080741 A1* | 4/2008 | Yokoo et al. | 382/104 |
| 2008/0245455 A1* | 10/2008 | Spetler | 152/209.1 |
| 2009/0034794 A1* | 2/2009 | Ishikawa | 382/103 |
| 2011/0060499 A1* | 3/2011 | Suzuki | 701/36 |

FOREIGN PATENT DOCUMENTS

| | | |
|---|---|---|
| JP | A-07-25301 | 1/1995 |
| JP | A-11-48819 | 2/1999 |
| JP | 2005-063090 A | 3/2005 |
| JP | 2005-205943 A | 8/2005 |
| JP | 2006123640 A * | 5/2006 |
| JP | 2007-140978 A | 6/2007 |
| JP | 2007-299048 A | 11/2007 |
| JP | 2008-084141 A | 4/2008 |
| JP | A-2008-122149 | 5/2008 |
| JP | 2008-226331 A | 9/2008 |

OTHER PUBLICATIONS

Japanese Office Action (Notification of Reasons for Refusal) issued from the Japanese Patent Office dated Mar. 6, 2012 for the corresponding JP patent application No. 2010-096166 (English translation attached).
Yamashita et al., "Efficient Features for Object Recognition," *Information Proceeding Society, Research Report CVIM 165*, pp. 221-236, Nov. 27, 2008.
Sheikh et al., "On the Sustained Tracking of Human Motion." *8th IEEE International Conference on Automatic Face and Gesture Recognition*, Sep. 17, 2008.
Ito et al., "Predicting Driver Operations inside Vehicles." *8th IEEE International Conference on Automatic Face and Gesture Recognition*, Sep. 17, 2008.

* cited by examiner

*Primary Examiner* — Sath V Perungavoor
*Assistant Examiner* — Xiaolan Xu
(74) *Attorney, Agent, or Firm* — Posz Law Group, PLC (57) ABSTRACT

In a hand-free driving warning process for a vehicle, when a grip state of a steering wheel is in a hand-free driving state, and the vehicle is in a travel state stipulated previously, a danger degree is derived based on a position of a vehicle compartment where a non-grip hand exists. In deriving the danger degree, when the non-grip hand is in a high danger position, a high level is set; when the non-grip hand exists in a low danger position, a middle level or a low lever is set. In the low level, any warning is not outputted; in the middle level, a warning is outputted in a sound volume smaller than a usual sound volume; and in the high level, a warning is outputted in the usual sound volume or greater.

12 Claims, 7 Drawing Sheets

FIG. 8B

DRIVING ASSISTANCE APPARATUS

CROSS REFERENCE TO RELATED APPLICATION

The present application is based on and incorporates herein by reference Japanese Patent Application No. 2010-96166 filed on Apr. 19, 2010.

FIELD OF THE INVENTION

The present invention relates to a driving assistance apparatus which outputs a warning to warn a vehicle driver against driving the vehicle with his/her hand free.

BACKGROUND OF THE INVENTION

[Patent document 1] JP-A-2008-122149

For instance, Patent document 1 recites a conventionally known apparatus to detect whether a steering wheel of a vehicle is held or gripped with both hands of a driver, based on a signal inputted from a sensor in-bedded in the steering wheel. In the apparatus recited in Patent document 1, when it is detected that the steering wheel is held by one hand of the driver, a travel state of the vehicle is determined whether to be within-stipulated or without-stipulated. The without-stipulated travel state is defined as a travel state where the driving manipulation with the steering wheel gripped by only one hand is inevitable. The within-stipulated travel state is other than the without-stipulated travel state. When the determined travel state is within-stipulated warning is outputted so as to warn the driver of driving the vehicle more safely.

In Patent document 1, the without-stipulated travel state includes the following: when the vehicle is moved backward; when the vehicle is rotated; when an in-vehicle instrument necessary for driving the vehicle (for example, a shift lever, or a blinker, a head lamp switch) is manipulated; and when the vehicle is in traffic congestion.

The state, where a driver performs a driving manipulation while holding or gripping the steering wheel with a single hand, may includes a state where the driver puts the hand, which is not gripping the steering wheel, on an armrest or window frame in the vehicle while performing the driving manipulation. In such a case, while relaxing moderately, the driver of the vehicle still concentrates on the driving manipulation, thereby usually enabling the vehicle to be driven safely in many cases.

Although the vehicle is driven still safely even with the steering wheel held with a single hand, such a state is defined as not according with the without-stipulated travel state in Patent document 1 thereby outputting a warning to the driver. That is, the warning is outputted to the driver concentrating on driving manipulation. The sense of incongruity is thus given to the driver; by contrast, the warning may lower the concentration of the driver on the driving manipulation.

That is, in Patent document 1, there is a disadvantage or problem that a warning is not suitably outputted to the driver in consideration of various states of the driver taking place at the time when the steering wheel of the vehicle is held with a single hand.

SUMMARY OF THE INVENTION

It is an object of the present invention to provide a technology to output appropriately a warning to a driver according to a state of the driver with a driving assistance apparatus that outputs a warning against driving manipulation with a hand free.

To achieve the above object, according to an example of the present invention, a driving assistance apparatus for a vehicle is provided as follows. A grip state detection section is configured to detect a grip state of a steering wheel in a compartment of the vehicle. An image acquisition section is configured to acquire a captured image of the compartment that covers a possible action range of a person who is seated in a driver's seat. A position specification section is configured to specify, based on a captured image acquired by the image acquisition section, a position where a non-grip hand exists, the non-grip hand being a hand that is separate from the steering wheel, on condition that (i) the grip state of the steering wheel is in a hand-free state, in which at least either of two hands is separate from the steering wheel as a result of detecting of the grip state detection section, and (ii) a travel state of the vehicle is within a stipulated travel state, which is predetermined. A danger derivation section is configured to derive a danger degree such that the danger degree comes to have a greater value as a degree of a danger against driving of the vehicle becomes higher because the non-grip hand exists in a position specified by the position specification section. A warning section is configured to execute an output of a warning in a weaker state as the danger degree derived by the danger derivation section comes to have a smaller value.

Under such a configuration, the position where a driver's hand not gripping the steering wheel is located (referred to as the position of the non-grip hand) is used to estimate the degree of the concentration of the driver on the driving manipulation, thereby enabling a warning to be suitably outputted.

As a result, the driver using the driving assistance apparatus can maintain the concentration on the driving manipulation of the vehicle, without having a sense of incongruity in the warning outputted in the case of driving with a single hand separate from the steering wheel (i.e., in the case of the hand-free driving).

According to another example of the present invention, a method being computer-implemented is provided in a driving assistance apparatus for a vehicle for deriving a danger degree to warn against driving manipulation of the vehicle. The driving assistance apparatus includes a grip state detection section configured to detect a grip state of a steering wheel in a compartment of the vehicle; and an image acquisition section configured to acquire a captured image of the compartment that covers a possible action range of a person who is seated in a driver's seat. The method includes (i) specifying, based on a captured image acquired by the image acquisition section, a position where a non-grip hand exists, the non-grip hand being a hand that is separate from the steering wheel, on condition that (a) the grip state of the steering wheel, is in a hand-free state, in which at least either of two hands is separate from the steering wheel as a result of detecting of the grip state detection section, and (b) a travel state of the vehicle is within a stipulated travel state, which is predetermined; (ii) deriving a danger degree such that the danger degree comes to have a greater value as a degree of a danger against driving of the vehicle becomes higher because the non-grip hand exists in the position specified; and (iii) executing an output of a warning in a weaker state as the danger degree derived comes to have a smaller value.

Relating to this example, as yet another example of the present invention, a program product stored in a non-transitory computer readable storage medium comprising instructions for execution by a computer, the instructions including the above method that is computer-implemented.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, description will be given to embodiments of the present invention with reference to the drawings.

First Embodiment

<Configuration of Driving Assistance Apparatus>

Figure 1:
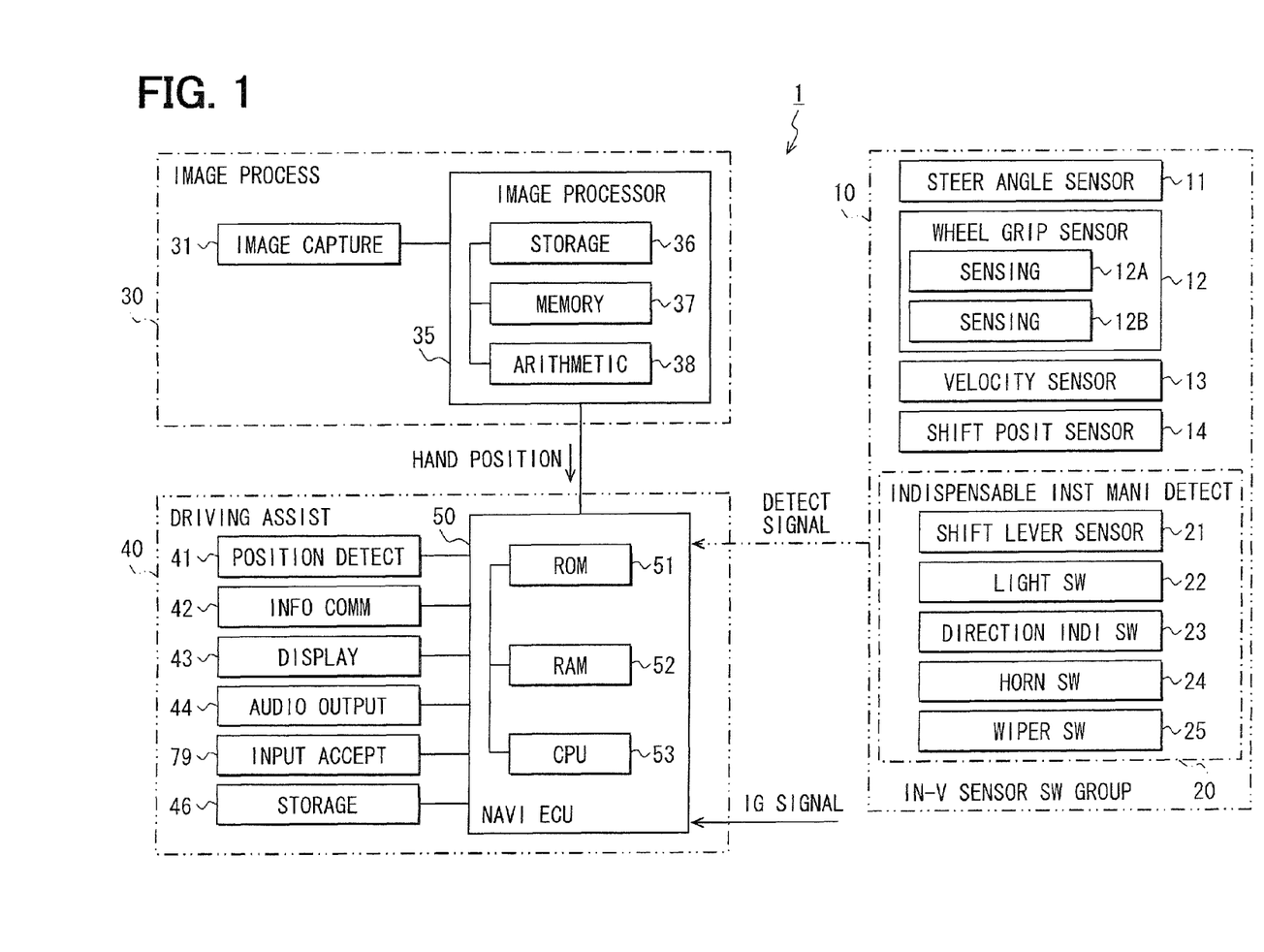
FIG. 1 is a block diagram showing an overall configuration of a driving assistance apparatus according to embodiments of the present invention.

A schematic configuration of a driving assistance apparatus according to embodiments of the present invention is illustrated in FIG. 1.

Figure 2:
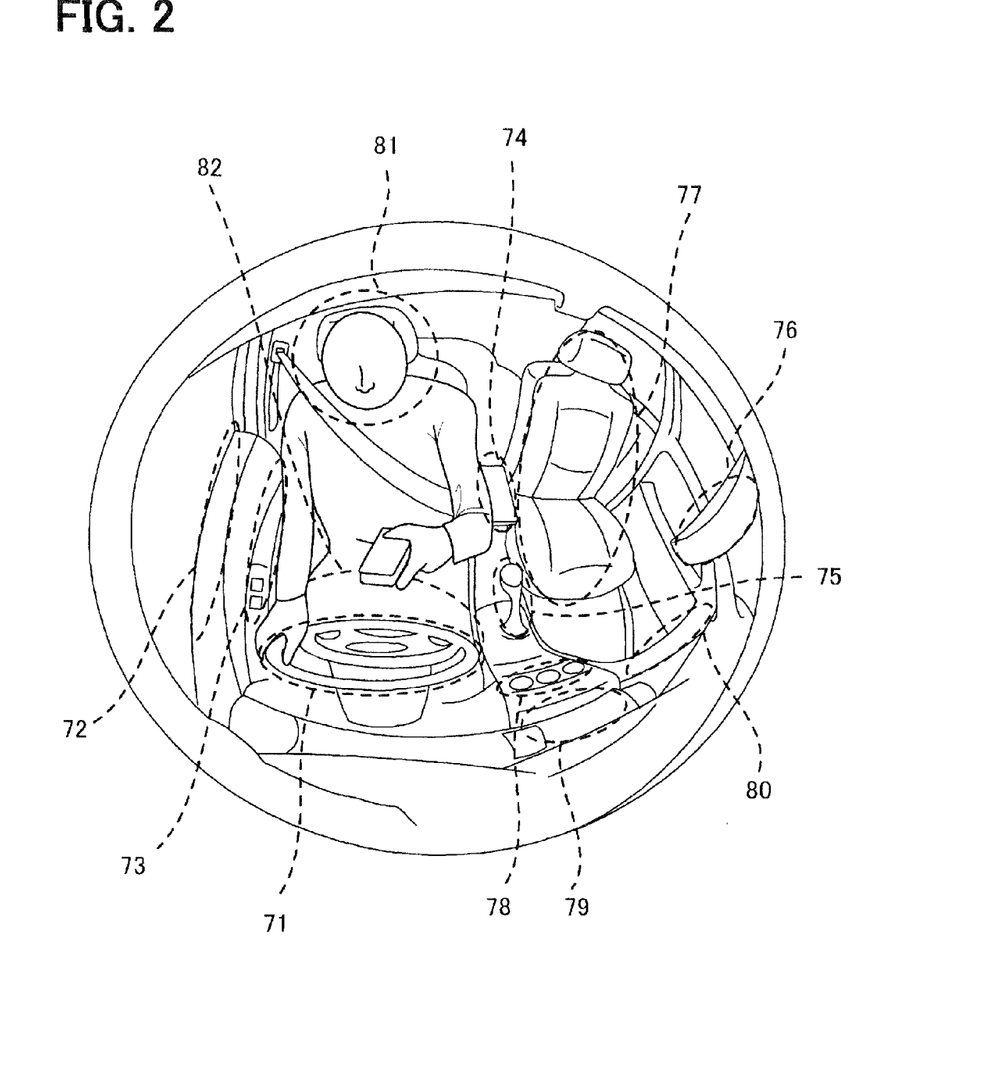
FIG. 2 is a diagram explaining an example of an image captured by an image processing device included in the driving assistance apparatus.

This driving assistance apparatus 1 is mounted in a subject vehicle, while determining a grip state of a steering wheel 71 (also referred to a wheel grip state) in the vehicle, i.e., whether the steering wheel is gripped with one hand or two hand (refer to FIG. 2). When it is determined that the wheel grip state is a state where the steering wheel 71 is held or gripped with a single hand, a position where a non-grip hand exists is at least specified; the non-grip hand signifies a hand that is not gripping the steering wheel 71. Based on the specified position where the non-grip hand is existing, a danger degree is derived; a warning is then outputted according to the danger degree.

In order to realize the above, the driving assistance apparatus 1 includes the following: an in-vehicle sensor switch group 10 that detect, of the subject vehicle a travel state including at least a grip state of the steering wheel 71; an image processing device 30 to specify at least a non-grip hand position which is a position where the driver's hand exists based on a captured image of a vehicle compartment; and a driving assistance device 40 to derive a danger degree based on a travel state of the subject vehicle detected by the in-vehicle sensor switch group 10, and the non-grip hand position specified by the image processing device 30, thereby outputting a warning according to the derived danger degree.

<Image Processing Device>

The image processing device 30 includes a capture portion 31 to capture a digital image, and an image processor 35 to apply image processing to an image captured (also referred to as a captured image) by the capture portion 31 thereby recognizing the position where the driver's hand exists.

As illustrated in FIG. 2, the capture portion 31 is provided to capture an image in a capture range that includes at least a possible action range of the driver in a vehicle compartment. The possible action range signifies a space of the vehicle compartment where a person seated in the driver's seat of the subject vehicle can behave (also referred to as a possible action range). The capture portion 31 is fixed in a position predetermined in the compartment (for example, near a rearview mirror). For instance, in the present embodiment, the capture range covers the following: the steering wheel 71 of the subject vehicle; the window frame 72 of the side of the driver's seat; armrests 73, 74; a shift lever 75; a rearview mirror 76; a passenger seat 77; an air-conditioner manipulation portion 78 provided in an instrument panel; an input reception portion 79 of a navigation apparatus; a glove box 80; a head region 81 that is a region where the head of the person seated in the driver's seat exists; and an upper thigh region 82 that is a region where the upper thigh (defined as a portion between a knee and a waist) of the person seated in the driver's seat exists.

The capture portion 31 may be a well-known light camera or a well-known infrared camera. The capture portion 31 may be provided with a lighting which irradiates the capture range with infrared light. The image processor 35 includes mainly a well-known microcomputer having at least a storage portion 36, a memory 37, and an arithmetic unit 38.

The storage portion 36 is a non-volatile memory such as a flash memory to enable rewrite of memory data. In addition, the memory 37 stores temporarily data produced in a course of processing. The captured image from the capture portion 31 is temporarily stored in the memory 37. The arithmetic unit 38 executes a processing program thereby executing image processing to a captured image stored in the memory 37.

The image processing according to the present embodiment includes a position recognition process, which recognizes a region (i.e., coordinates) in the captured image in which the driver's hand and lower arm exist. The position recognition process is made by well known various technologies; thus, detailed explanation is omitted. The present embodiment may use the following technology, which derives a predetermined feature quantity from a captured image, and collates the derived feature quantity with a discrimination circuit indicating a person's hand (e.g., a part from a wrist to a fingertip) and lower arm (a part from an elbow to a wrist). In the above technology, the well-known Haar-Like feature is generally used as a feature quantity; the discrimination circuit is generated by learning the feature quantity with a well-known machine learning (for example, AdaBoost).

The image processing according to the present embodiment further includes a position determination process which specifies, as a position in the compartment where a driver's hand exists, a position of the compartment corresponding to the region (coordinates) in, the captured image recognized in the position recognition processing. The position in the compartment recognized in the position determination process is one of the following positions: the steering wheel 71 of the subject vehicle; the window frame 72 of the side of the driver's seat; the armrests 73, 74; the shift lever 75; the rearview mirror 76; the passenger seat 77; the air-conditioner manipulation portion 78; the input reception portion 79 of the navigation apparatus; the glove box 80; the head region 81; the upper thigh region 82; and another position other than the above positions 71 to 82.

That is, the image processing device 30 of the present embodiment specifies, from the captured image the position in the vehicle compartment where the driver's hand exists, and outputs the specified result to the driving assistance device 40.

<In-Vehicle Sensor Switch Group>

The in-vehicle sensor switch group 10 contains a steering angle sensor 11, a steering wheel grip sensor 12, a vehicle velocity sensor 13, a shift position sensor 14, and an indispensable instrument manipulation detection portion 20. These sensors 11 to 14 and the indispensable instrument manipulation detection portion 20 output, as detection signals, detection results to the driving assistance device 40.

The steering angle sensor 11 detects a steering angle of the subject vehicle. The velocity sensor 13 detects a velocity of the subject vehicle. The shift position sensor 14 detects a position of the shift lever 75 (also referred to as a shift position).

Furthermore, the wheel grip sensor 12 detects a grip state of the steering wheel 71. The wheel grip sensor 12 of the present embodiment is configured to arrange two sensing portions 12A, 12B in portions in the steering wheel 71 gripped by the left hand and right hand, respectively; the sensing portions 12A, 12B are, for instance, pressure sensors or touch sensors, of which signals are turned into a high level when a people's skin contacts. That is, the detection signal outputted from each of the sensing portions 12A, 12B in the wheel grip sensor 12 becomes in a high level when the corresponding portion of the steering wheel 71 is gripped, or becomes in a low level when the corresponding portion of the steering wheel 71 is not gripped.

The indispensable instrument manipulation detection portion 20 detects that an indispensable instrument, which is an instrument indispensable for the driving operation of the vehicle, is manipulated so as to activate or stop an operation. This indispensable instrument manipulation detection portion 20 contains the shift lever manipulation sensor 21, of which the detection signal is turned into a high level when the hand contacts the shift lever 75.

Furthermore, the indispensable instrument manipulation detection portion 20 includes a lamplight switch 22, a direction indicator switch 23, a horn switch 24, and a windshield wiper switch 25. Those switches 22 to 25 each are turned on and turned off when a manipulation is made to a manipulation portions or means arranged in the steering wheel 71 or a steering wheel column. The lamplight switch 22 is associated with a head light of the subject vehicle as an indispensable instrument. The direction indicator switch 23 is associated with a direction indicator of the subject vehicle as an indispensable instrument. The horn switch 24 is associated with a horn of the subject vehicle as an indispensable instrument. The wiper switch 25 is associated with a wiper of the subject vehicle as an indispensable instrument.

<Driving Assistance Device>

The driving assistance device 40 includes a position detection portion 41, an information communications portion 42, a display portion 43, an audio output portion 44, an input reception portion 79, a storage portion 46, and a navigation electronic control unit 50 (also referred to as a navigation ECU 50).

The position detection portion 41 detects a present position and heading direction of the subject vehicle and at least includes a well-known GPS receiver, a gyro sensor, and a geomagnetic sensor. In addition, the information communications portion 42 is to acquire information from a communications device provided in a road via dedicated wireless communications or public communications network; the acquired information includes traffic congestion information which at least indicates the presence or absence of the traffic congestion arising on the vicinity of the present position of the subject vehicle and the starting position and ending position of the traffic congestion.

Furthermore the display portion 43 is, for instance, a liquid crystal display to display an image according to a control signal from the navigation ECU 50. The audio output, portion 44 is, for instance, a speaker to convert a control signal from the navigation ECU 50 into a sound and output the sound. The input reception portion 79 is, for instance, a touch panel integrated into the display portion 43 or a key provided around the display portion 43 to receive various instructions from an occupant.

The storage portion 46 is a rewritable non-volatile storage device or media such as a hard disk drive or a flash memory. The storage portion 46 stores previously map data, audio data for guidance voice recognition data, etc. The map data includes node data, link data, cost data, background data, road data, geographical data, name data, mark data, intersection data, facility data, etc.

Furthermore, the navigation ECU 50 mainly includes a well-known microcomputer, which has at least a ROM 51 storing data whose memory contents need to be held even if the power source is disconnected, a RAM 52 storing data temporarily, a CPU 53 executing processing according to the program stored in the ROM 51 or RAM 52.

In addition, the navigation ECU 50 receives not only the detection signal from the in-vehicle sensor switch group 10, but also an ignition (IG) signal. The navigation ECU 50 executes the processing program, thereby providing a well-known navigation function of a navigation apparatus, which performs a route guidance to a destination designated according to an input from an outside based on the present position and heading direction of the subject vehicle calculated from the output signal from the position detection portion 41, and the map data stored in the storage portion 46.

Furthermore, the navigation ECU 50 derives a danger degree based on the travel state of the subject vehicle and the position where the hand of the driver of the subject vehicle is located, and executes a hand-free driving warning process to output a warning according to the derived danger degree.

<Hand-Free Driving Warning Process>

Next, the hand-free driving warning process (also referred to as the one-hand driving warning process) executed by the navigation ECU 50 is explained. The hand-free driving warning process starts an execution of processing when the IG signal is inputted, and repeats the execution with predetermined time intervals.

It is further noted that a flowchart or the processing of the flowchart in the present application includes sections (also referred to as steps), which are represented, for instance, as S110. Further, each section can be divided into several subsections while several sections can be combined into a single section. Furthermore, each of thus configured sections can be referred to as a means or unit and achieved not only as a software device but also as a hardware device.

Figure 3:
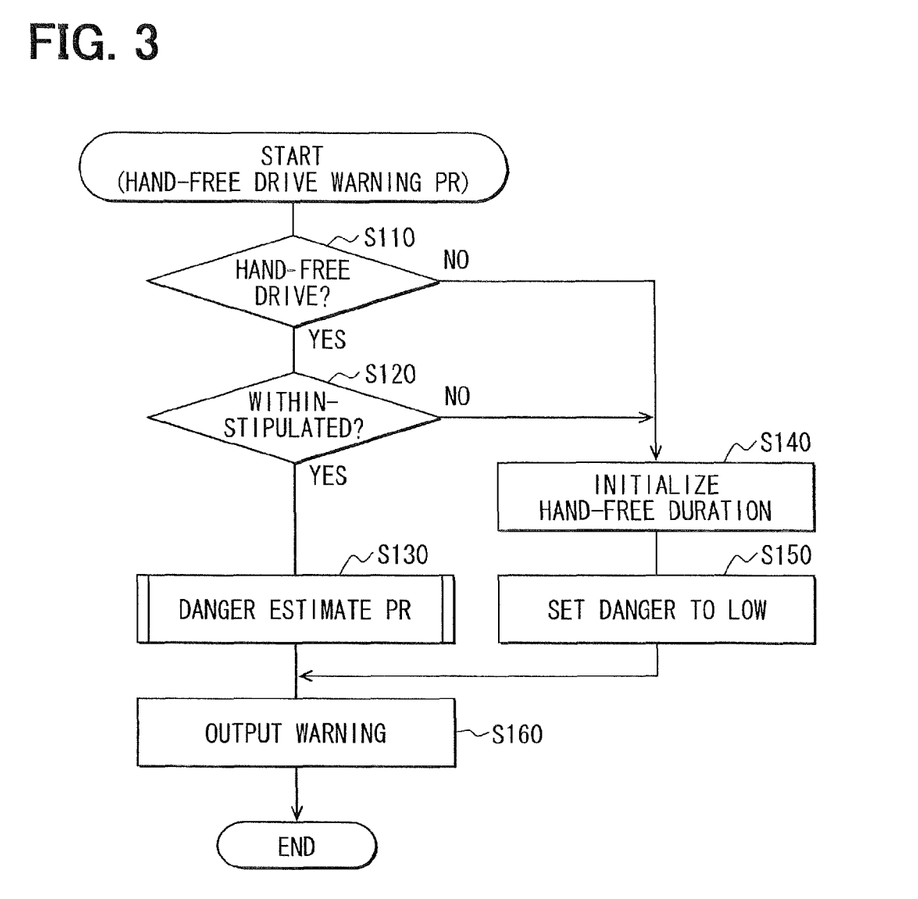
FIG. 3 is a flowchart diagram illustrating a hand-free driving warning process according to a first embodiment.

With reference to FIG. 3, when the hand-free driving warning process is started, it is determined whether the grip state of the steering wheel 71 corresponds to a hand-free driving state in which at least one hand is separated from the steering wheel 71 based on the detection signal from the wheel grip sensor 12 (S110).

For instance, at S110 of the present embodiment, when the level of the detection signal from at least one of the sensing portions 12A, 12B of the wheel grip sensor 12 is in a low level, the hand-free driving state is determined (also referred to as a one-hand driving state). In contrast, when both the levels of the detection signals from the sensing portions 12A, 12B are in the high level, a both-hands driving state in which the steering wheel 71 is gripped with both the hands of the driver is determined.

When it is determined that the grip state of the steering wheel 71 is a hand-free driving state (S110 YES), the processing proceeds to S120. At S120, it is determined whether the travel state of the subject vehicle accords with a within-stipulated travel state that is other than a without-stipulated travel state, based on the detection signal from the in-vehicle sensor switch group 10. The without-stipulated travel state is defined as a travel state in which a hand-free driving manipulation is permitted as being inevitable. In other words, the within-stipulated travel state is defined as a travel state in which a hand-free driving manipulation is unpermitted as being evitable.

In the present embodiment, the without-stipulated travel state in the present embodiment includes, for instance, the following: the backward moving state where the subject vehicle is moved backwardly; the rotating state where the subject vehicle is rotated; the indispensable instrument manipulating state where an indispensable instrument is manipulated; the in-traffic congesting state where the subject vehicle is involved in the traffic congestion; and the slow speed state where the subject vehicle is in the low speed.

At S120 of the present embodiment, it is determined whether the travel state of the subject vehicle accords with a without-stipulated travel state using the technique described in JP-A-2008-122149. That is, when the detection signal from the shift position sensor 14 indicates that the shift position is "R" (that is, backward movement), it is determined that the present travel state of the subject vehicle accords with the backward moving state. In addition, when the steering angle detected by the steering angle sensor 11 is greater than a predetermined value or angle, it is determined that the travel state of the subject vehicle accords with the rotating state. After it is determined that the grip state of the steering wheel 71 is a hand-free driving state at S110, the detection signal from the indispensable instrument manipulating detection portion 20 changes within a predetermined period. In this case, it is determined that the travel state of the subject vehicle accords with the indispensable instrument manipulating state. Furthermore, when the present position of the subject vehicle is located in the road range from the start position to the end position of the traffic congestion acquired in the information communications portion 42, it is determined that the travel state of the subject vehicle accords with the traffic congesting state. In addition, when the vehicle speed detected by the vehicle velocity sensor 13 is less than a predetermined value, it is determined that the travel state of the subject vehicle accords with the slow speed state.

When the travel state of the subject vehicle does not accord with the without-stipulated travel state as a result of the determination at S120, namely, when the travel state accords with the within-stipulated travel state (S120: YES), the processing proceeds to S130. At S130, a hand-free duration is obtained. The hand-free duration is a duration or time length for which a non-grip hand, which is a hand not gripping the steering wheel 71, is continuously separated from the steering wheel 71. At the same time, a position where the non-grip hand exists (also referred to as a non-grip hand position) is specified, and the danger estimation process which estimates a danger degree based on the specified position and the obtained hand-free duration (S130).

<Danger Estimation Process>

The danger estimation process started at S130 of the hand-free driving warning process is explained.

Figure 4:
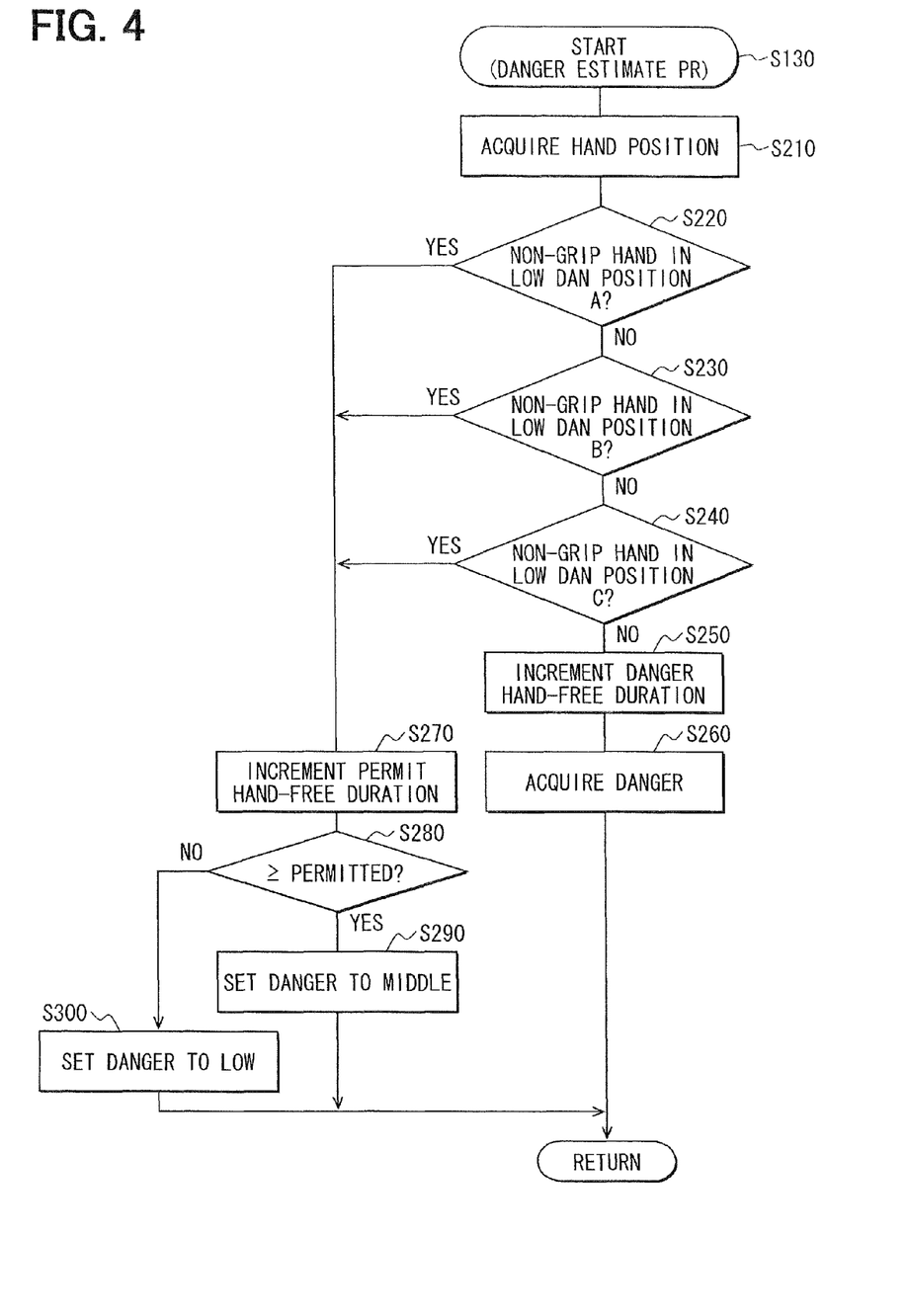
FIG. 4 is a flowchart diagram illustrating a danger estimation process according to the first embodiment.

With reference to FIG. 4, when the danger estimation process is started, positions at which the left hand and the left hand of the driver exist (also referred to left and right hand positions) are obtained within the vehicle compartment from the image processing device 30 (S210). Then, based on the left hand position and the right hand position acquired at S210, it is determined whether there is a non-grip hand located in a predetermined first low danger position A (window frame 72 in the present embodiment) (S220). It is noted that a low danger position is where the driver puts a hand in relaxing himself/herself while performing the driving manipulation. When it is determined that there is no non-grip hand existing in the first low danger position A (S220: NO), it is determined whether there is a non-grip hand existing in a predetermined second low danger position B (armrests 73, 74 in the present embodiment) (S230).

When it is determined that there is no non-grip hand existing in the second low danger position A (S230: NO), it is determined whether there is a non-grip hand existing in a predetermined third low danger position C (upper thigh 82 in the present embodiment) (S240). When it is determined that there is no non-grip hand existing in the third low danger position C (S240: NO), a dangerous hand-free duration, which is one type of the hand-free duration, is incremented by a predetermined time (S250).

Figure 5:
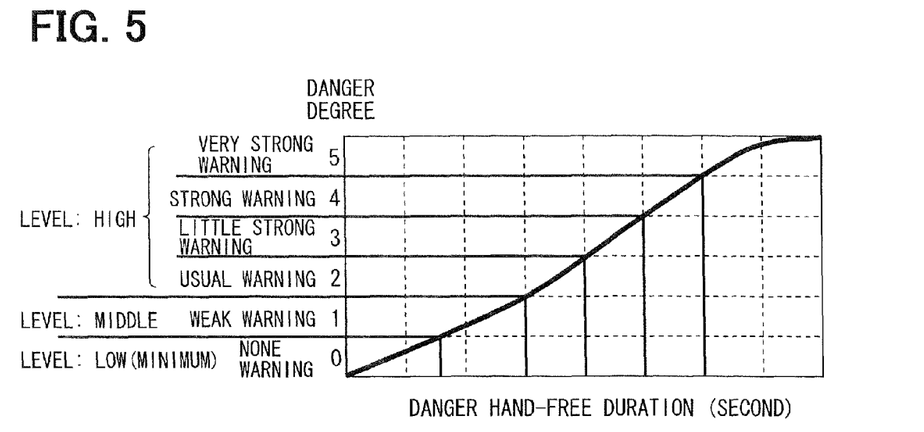
FIG. 5 is a diagram illustrating an outline of a danger estimation map according to the first embodiment.

Thus, the non-grip hand is estimated to exist in the high danger position which is other than the low danger position A to C; the danger degree corresponding to the dangerous hand-free duration is set by acquiring from the danger estimation map prepared previously (S260). The danger estimation map in the present embodiment may be previously obtained by an experiment etc. As illustrated in FIG. 5, the association between the dangerous hand-free duration and the danger degree is provided such that as the dangerous hand-free duration becomes longer, the value of the danger degree becomes larger (i.e., exhibiting a monotone increase). The association between the dangerous hand-free duration and the danger degree may be provided such that the danger degree varies in a straight line in proportion to the dangerous hand-free duration; or it may be varied in a curved line, or in a step-by-step (i.e., step-wise).

Usually, when the non-grip hand exists in the high danger position the driver manipulates the in-vehicle instrument located in the high danger position in many cases; thereby, the dangerous hand-free duration becomes long. Therefore, the danger degree acquired at S260 in the present embodiment has a value that becomes greater in "High" level as the dangerous hand-free duration becomes longer.

Then, the present danger estimation process is ended, advancing the processing to S160 of the hand-free driving warning process. If the non-grip hand exists in any one of the low danger positions A, B, and C as a result of determination at S220, S230, and S240 (S220: YES, S230: YES, or S240: YES), a permitted hand-free duration, which is one type of the hand-free duration, is incremented by a predetermined time (S270). Then, it is determined whether the permitted hand-free duration is equal to or greater than a predetermined permitted time or duration (for example, 30 minutes) (S280). The permitted hand-free duration may be also referred to as a non-grip hand existence duration for which the non-grip hand continues to exist in the low danger position.

When the permitted hand-free duration is equal to or greater than the permitted duration as a result of determination at S280 (S280: YES), the danger degree is set to "Middle" level (S290). In contrast, when the permitted hand-free duration is less than the permitted duration as a result of determination at S280 (S280: NO), the danger degree is set to "Low (minimum)" level (S300).

That is, in the present embodiment, when the non-grip hand exists in the low danger position, there is a possibility that the driver is driving the subject vehicle in a relaxed state, thereby setting the danger degree to "Low level (minimum)." However, even if the non-grip hand exists in the low danger position, the duration for which the non-grip hand exists continuously in the low danger position may become longer. In this case, the danger degree in driving the subject vehicle becomes higher; the danger degree comes to be set to the "Middle" level greater than the "Low" level.

Then, the present danger estimation process is ended, advancing the processing to S160 of the hand-free driving warning process. The explanation is returned to the flowchart in FIG. 3 regarding the hand-free driving warning process. When it is determined at S120 that the travel state of the subject vehicle accords with the without-stipulated travel state, namely, when the travel state does not accord with the within-stipulated travel state (S120: NO), the processing proceeds to S140. When it is determined at S110 that the grip state of the steering wheel 71 is the both-hands driving state, the processing also advances to S140.

At S140, the hand-free duration or time length (in this case, both the dangerous hand-free duration and the permitted hand-free duration) are initialized; namely, the duration is set to zero (0) in the present embodiment. Then, the danger degree is set to the "Low (Minimum)" level (S150) That is, when the grip state of the steering wheel 71 is both-hands driving state, the subject vehicle is determined to be derived safely, thereby setting the danger degree to the minimum value. Further, under the condition that it is determined that the travel state of the subject vehicle accords with the without-stipulated travel state, since the duration of the non-grip state of the steering wheel 71 is estimated to be short, or since the travel state of the subject vehicle is estimated to be a safe travel state, the danger degree is set to the minimum value.

Then, a warning is outputted via the display portion 43 and the audio output portion 44, while the strength of the warning outputted is controlled to be proportional to the value in the level of the danger degree (S160). For instance, at S160 of the present embodiment, warnings are outputted as follows: when the danger degree is of the maximum value in the "HIGH" level, the warning is outputted in "VERY STRONG" level; when the danger degree is of the minimum value in the "HIGH" level, the warning is outputted in "USUAL" level; when the danger degree is in the "MIDDLE" level, the warning is outputted in "WEAK" lower than "USUAL" level; and when the danger degree is in the "LOW (MINIMUM)" level, the warning is not outputted, namely, the output of the warning is prohibited. For instance, as the danger degree is higher, the warning outputted from the audio output portion 44 has an audio volume in higher level; simultaneously, as the danger degree is higher, the warning message displayed in the display portion 43 becomes stronger or stricter.

Then, the present hand-free driving warning process is ended; the processing stands by until the hand-free driving warning process is re-started (that is until a predetermined time passes). As mentioned above, in the hand-free driving warning process according to the present embodiment, when the grip state of the steering wheel 71 is the hand-free driving state and, simultaneously, the travel state of the subject vehicle accords with the within-stipulated travel state, the danger degree is derived based on the position in the vehicle compartment where the non-grip hand exists. In such derivation of the danger degree, when the non-grip hand exists in the high danger position, the danger degree is set up such that as the dangerous hand-free duration is longer, the value becomes greater in the "HIGH" level. In contrast, when the non-grip hand exists in the low danger position, the danger degree is set to the "MIDDLE" level or the "LOW" level.

When the danger degree is in the "LOW" level, the warning is not outputted; when the danger degree is in the "MIDDLE" level, the warning is outputted in a sound volume weaker or lower than that of "USUAL" level; and when the danger degree is in the "HIGH" level, the warning is outputted in a sound level stronger than "USUAL" level.

Effect of First Embodiment

According to the driving assistance apparatus 1 of the present embodiment, the warning can be outputted in a suitable strength according to the position where the driver's non-grip hand exists, or according to the degree of the driver's concentration on the driving manipulation on condition that the grip state of the steering wheel 71 is a hand-free driving state.

In particular, in the hand-free driving warning process of the present embodiment, when the non-grip hand exists in the low danger position, and, simultaneously, the permitted hand-free duration is less than the predetermined permitted duration, the warning itself is not outputted. Thus, the driver, who drives the subject vehicle while putting the non-grip hand on the low danger position, can be concentrated on driving manipulation of the vehicle without need to be conscious of a warning.

Furthermore the hand-free driving warning process of the present embodiment features as follows. When the permitted hand-free duration is greater than the predetermined permitted duration even on condition that the non-grip hand exists in the low danger position, or when the non-grip hand exists in the high danger position, the warning is outputted with the strength proportional to the danger degree. The driver of the subject vehicle can recognize that the danger degree is increased by the driver's action.

Thus, according to the driving assistance apparatus 1, the driver of the subject vehicle can make an effort to drive the subject vehicle safely, without having the sense of discomfort or incongruity against the warning outputted in the case of the hand-free driving state. Further, in the danger estimation process of the driving assistance apparatus 1, the positions where the non-grip hand exists are determined in respect of two statuses (binary values) of the high danger position and the low danger position. Accordingly, in the danger estimation process of the driving assistance apparatus 1, the processing load for specifying the positions of the non-grip hand can be prevented from increasing.

Second Embodiment

The following describes a second embodiment. The driving assistance apparatus of the present embodiment differs from that of the first embodiment in that the processing of the danger estimation process. Accordingly, in the driving assistance apparatus according to the present embodiment, the same configuration or processing as that of the first embodiment is omitted from the explanation while the identical reference numbers are assigned. The explanation focuses on the Processing of the danger estimation process different from that of the first embodiment.

<Danger Estimation Process>

Figure 6:
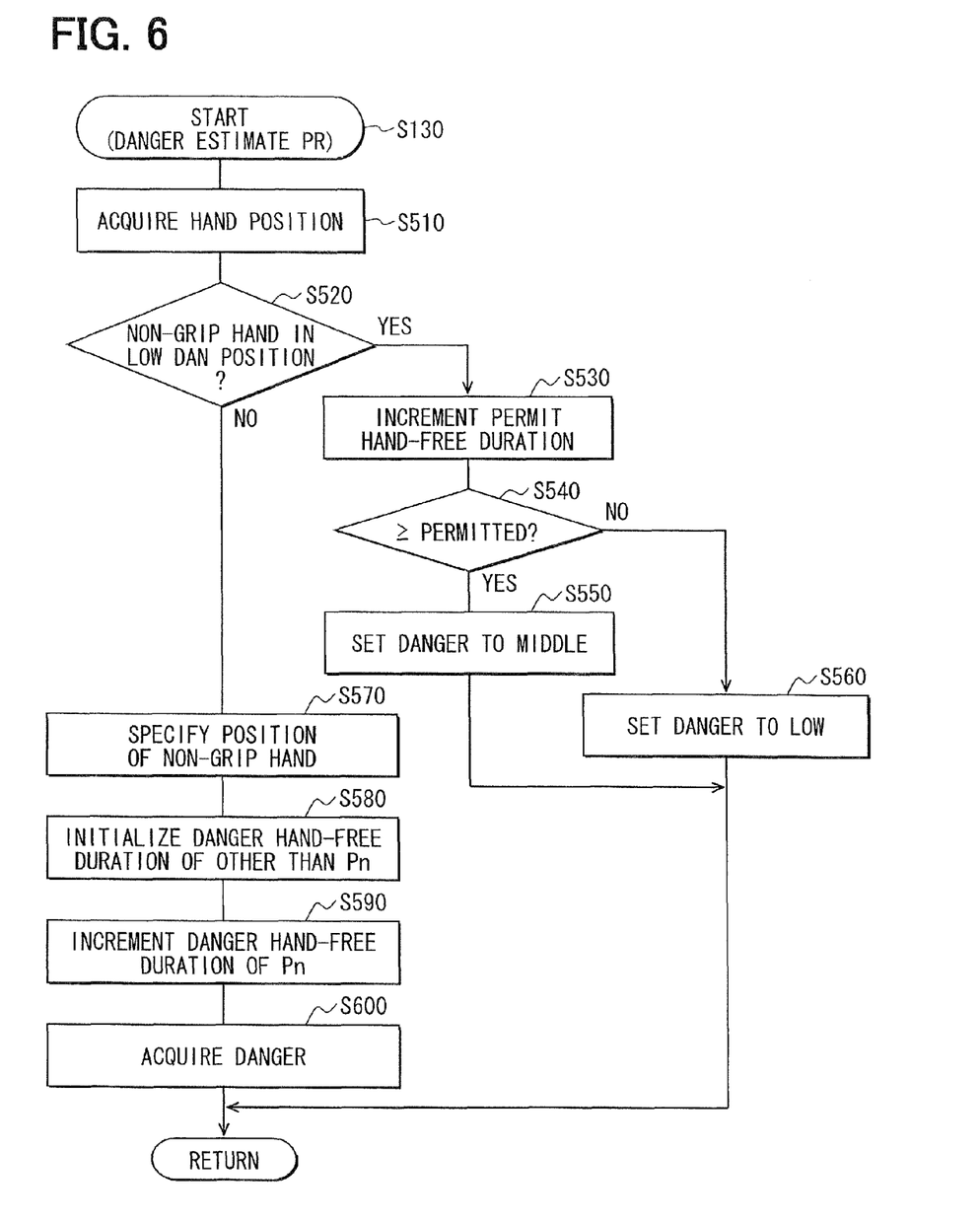
FIG. 6 is a flowchart diagram illustrating a danger estimation process according to a second embodiment.

With reference to FIG. 6, the danger estimation process of the present embodiment takes place as follows. When the danger estimation process is started at S130 of the hand-free driving warning process, positions at which the left hand and right hand of the driver exist (also referred to left and right hand positions) are obtained, respectively, within the vehicle compartment from the image processing device 30 (S510).

Then, a non-grip hand that does not grip the steering wheel 71 is determined from the obtained positions of the both hands; it is determined whether the non-grip hand exists in a low danger position out of the positions in the vehicle compartment (S520). Similar to the first embodiment, the low danger position indicates a position at which a driver places the non-grip hand when relaxing during the driving. A window frame 72, armrests 73, 74, and an upper thigh area 82 are defined as a low danger position.

When it is determined that the non-grip hand does not exist in the low danger position (S520 NO), i.e., if it exists in the high danger position (S520: NO), the processing proceeds to S570 mentioned later. In contrast, when it is determined that the non-grip hand exists in the low danger position (S520: YES), a permitted hand-free duration, which is one type of the hand-free duration, is incremented by a predetermined time (S530). Then, it is determined whether the permitted hand-free duration is equal to or greater than a predetermined permitted duration (for example, 30 minutes) (S540).

When the permitted hand-free duration is equal to or greater than the permitted duration as a result of determination at S540 (S540: YES), the danger degree is set to "Middle" level (S550). In contrast, when the permitted hand-free duration is less than the permitted duration as a result of determination at S540 (S540: NO), the danger degree is set to "Low (minimum)" level (S560).

Then, the present danger estimation process is ended, advancing the processing to S160 of the hand-free driving warning process. In contrast, when the non-grip hand exists in the high danger position (S520: NO), a position (referred to a present existing position Pn) where the non-grip hand exists is specified (S570). Out of the danger hand-free durations respectively corresponding to detectable positions in the vehicle compartment, the danger hand-free durations other than that of the present existing position Pn are initialized (to "0" zero in the present embodiment) at S580. Herein, the detectable positions each are a position in the vehicle compartment that can be specified by a position determination process. Furthermore, the danger hand-free duration corresponding to the present existing position Pn is incremented by a predetermined time (S590).

Figure 7:
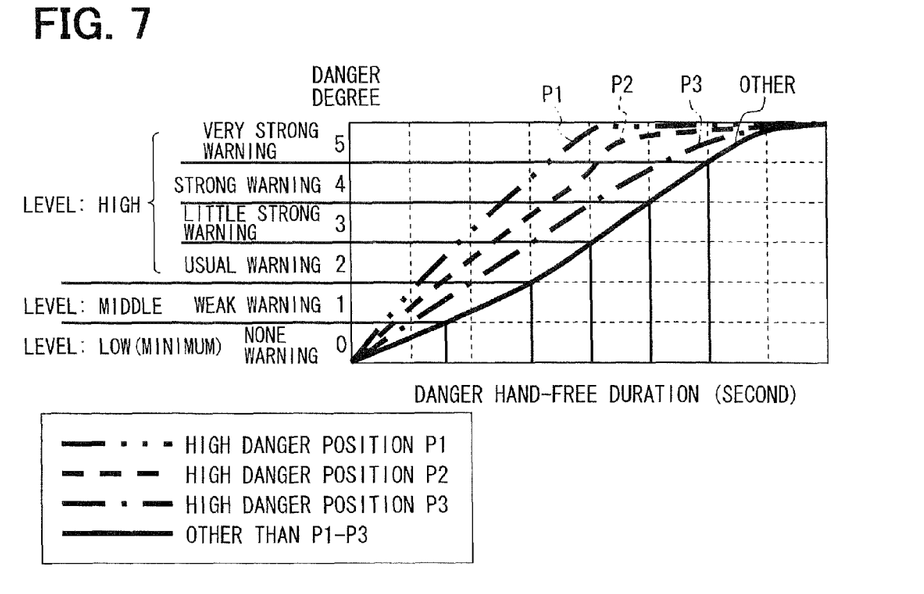
FIG. 7 is a diagram illustrating an outline of a danger estimation map according to the second embodiment.

Next, the danger degree corresponding to the association between (i) the present existing position Pn and (ii) the danger hand-free duration is set by acquiring from the danger estimation map prepared previously (S600). The danger estimation map in the present embodiment may be previously obtained by an experiment etc. As illustrated in FIG. 7, the association between the danger hand-free duration and the danger degree is provided such that as the danger hand-free duration becomes longer, the value of the danger degree becomes greater. The association between the danger hand-free duration and the danger degree may be provided such that the danger degree varies in a straight line in proportion to the danger hand-free duration; or it may be varied in a curved line, or in a step-by-step.

Furthermore, the danger estimation map of the present embodiment indicates the association such that as the detectable position becomes farther away from the driver's seat, the danger degree becomes higher. For example, out of the detectable positions, the passenger seat 77 and the glove box 80 are defined as a high danger position P1; the air-conditioner manipulation portion 78 and the input reception portion 79 of the navigation apparatus is defined as a high danger position P2; and the head area 81 is defined as a high danger position P3. In the danger estimation map exemplified in FIG. 7, the association is made such that the danger degree increases in the ascending order of the high danger position P3, the high danger position P2, and the high danger position P1.

That is, when the non-grip hand exists in the high danger position P1, P2, the driver tends to be manipulating an in-vehicle instrument located in the positions P1, P2 in many cases. When the non-grip hand exists in the high danger position P3, the driver tends to be manipulating the goods (for example, food and drink, tobacco, or cellular phone) brought into the vehicle compartment, i.e., be during the eating, drinking, smoking, or calling). In the cases, the danger degree against the driving manipulation of the subject vehicle becomes higher as the movement amount of the body for the driver to cause the non-grip hand to exist in the high danger position becomes greater. Thus as the detectable position becomes farther away from the driver's seat, the danger degree becomes higher.

Further, in the cases that the driver is during manipulating an in-vehicle instrument, eating, drinking, smoking, or calling, the dangerous hand-free duration becomes longer. Thereby, the danger degree acquired at S600 of the present embodiment becomes higher in the "HIGH" level, as the danger hand-free duration becomes longer.

Then, the present danger estimation process is ended, advancing the processing to S160 of the hand-free driving warning process.

Effect of Second Embodiment

As explained above, in the driving assistance apparatus of the present embodiment the warning is outputted more strongly as the high danger position at which the non-grip hand exists becomes farther away from the driver's seat.

The driving assistance apparatus of the present embodiment enables the driver to recognize the association in which the danger degree increases as the necessity of moving the body of the driver becomes greater.

Other Embodiments

Up to this point, description has been given to an embodiment of the present invention. However, the present invention is not limited to the above embodiment, and it can be variously embodied as long as not departing, from the subject matter of the present invention.

For example, in the danger estimation map in the second embodiment, the association between the detectable position and the danger degree is provided such that the danger degree increases as the detectable position requires more movement amount of the body for the driver to cause the non-grip hand to exist or manipulate. Without need to be limited thereto, the association between the detectable position and the danger degree may be varied. That is, the danger degree may be designed to increase as a time length necessary for the non-grip hand to manipulate a target object which exists in the detectable position and then reach the steering wheel 71 becomes longer. Further, the danger degree may be designed to increase as a time length for which the driver moves the sight line from the vehicle heading direction becomes longer when manipulating the target object which exists in the high danger position.

Figure 8A:
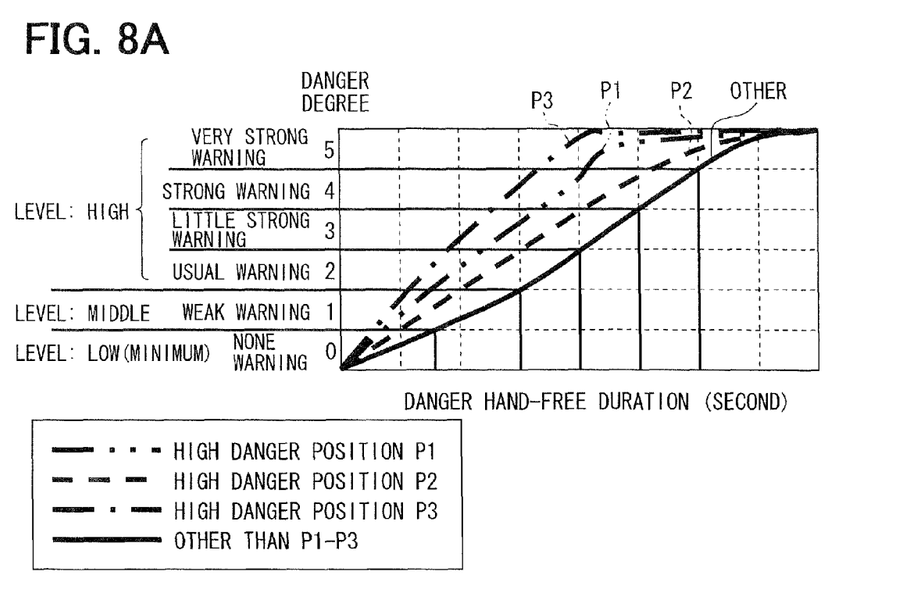
FIGS. 8A, 8B are diagrams each illustrating an outline of a danger estimation map according to a modification of the second embodiment.

When the former case is adopted, the association between the detectable position and the danger degree may be provided, as illustrated in FIG. 8A, such that the danger degree becomes greater in the ascending order of the high danger position P2, the high danger position P1, and the high danger position P3. In other words, in the ascending order of the action to manipulate an in-vehicle instrument located in the high danger position P2, the action to manipulate an in-vehicle instrument located in the high danger position P1, and the action of eating, drinking, smoking, or calling in the high danger position P3 the necessity for the driver to concentrate is estimated to be increased. The above actions are estimated to decrease the consciousness of or concentration on the driving of the subject vehicle.

Figure 8B:
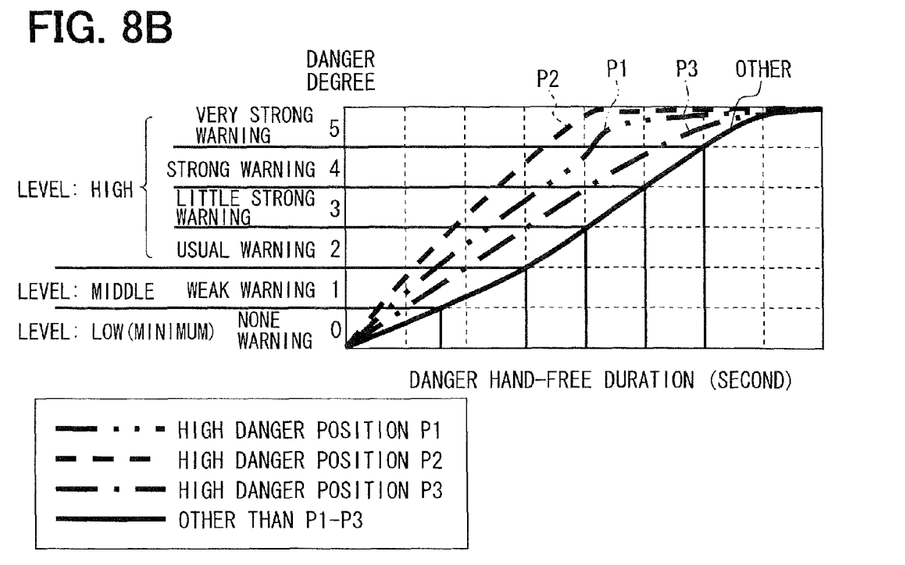

In contrast, when the latter case is adopted, the association between the detectable position and the danger degree may be provided, as illustrated in FIG. 8B, such that the danger degree becomes greater in the ascending order of the high danger position P3, the high danger position P1 and the high danger position P2. In other words, in the ascending order of the action of eating, drinking, smoking, or calling at the high danger position P3, the action to manipulate an in-vehicle instrument located in the high danger position P1, and the action to manipulate an in-vehicle instrument located in the high danger position P2, the duration or time length for which the driver moves the sight line from the vehicle heading direction is estimated to become longer. The above actions are estimated to decrease the consciousness of or concentration on the driving of the subject vehicle.

When those danger estimation maps are used to provide or define the danger degree the driver of the subject vehicle can be made to be able to recognize executing of the dangerous action against the driving manipulation, enabling the driver to execute the safer driving manipulation.

Further, in the driving assistance apparatus 1 of the above embodiments, the image processing device 30 executes the image processing. The navigation ECU 50 can execute the image processing. That is, the position of the driver's hand may be specified by the navigation ECU 50 instead of the image processing device 30.

Furthermore, in the driving assistance apparatus 1 of the above embodiment the grip state of the steering wheel 71 is detected based on the detection signal from the wheel grip sensor 12. Without need to be limited thereto, another method of detecting the grip state of the steering wheel 71 may be used. For instance, it may be detected from a captured image. In this case, when the driver's hand exists as overlapping on an area of the captured image where the image of the steering wheel 71 (referred to as a steering wheel area) is present it is determined that the steering wheel 71 is gripped by a driver's hand. Further, in this case, when the number of driver's hand overlapping on the steering wheel area is two, it may be determined that the steering wheel 71 is gripped by both the hands of the driver, i.e., in the both-hands grip state. When the number of driver's hand overlapping on the steering wheel area is one or zero, it may be determined that the grip state of the steering wheel 71 is in the hand-free driving state.

The method of specifying the position of the driver's hand may be not restricted to the method described in the above embodiments. For example, as described in JP-A-2009-037534, the position of the driver's hand may be specified as follows. Detecting a characteristic point (for example, a wrist, elbow, or shoulder) from the captured image; collating the detected characteristic point with each action inference model previously prepared for every action which the driver can execute; specifying the action corresponding to the action inference model having the highest degree in accordance; and defining, as a position of the driver's hand, a position of the in-vehicle instrument manipulated by the driver in the specified action.

In addition, at S160 of the above hand-free driving warning process, the output of a warning is prohibited when the danger degree is set in "LOW" level. However, the warning in the "LOW" level of the danger degree is not limited thereto, but the output of the warning may be made in a level much lower than "WEAK" level. That is, the warning strength for the "LOW" level may be designed as needed as long as the strength of the warning remains the maximum strength as compared with other levels.

Furthermore, the warning in the hand-free driving warning process of the above embodiments is outputted by changing the volume of the sound outputted from the audio output portion 44. However, it may be outputted by changing the cycle of the sound or tone of the sound. In addition, not only the message or contents of the warning are changed in the display portion 43, but also the character font or figure may be changed in the display portion 43.

Although the hand-free driving warning process is executed by the navigation ECU 50 in the driving assistance apparatus 1 of the above embodiments, it may be executed by another apparatus such as the image processor 35, for example.

[Functions]

The wheel grip sensor 12 of the above embodiment may function as a grip state detection means or device. The image processing device 30 may function as an image acquisition means or device. S110, S120 in the hand-free driving warning process, and S210 to S240 in the danger estimation process (or S510, S520, S550) may function as a position specification means or section. Furthermore, S150 in the hand-free driving warning process and S260, S290, and S300 (or S540, S550, S600) in the danger estimation process may function as a danger derivation means or section. S160 in the hand-free driving warning process may function as a warning means or section.

Each or any combination of processes, functions, sections, steps, or means explained in the above can be achieved as a software section or unit (e.g., subroutine) and/or a hardware section or unit (e.g., circuit or integrated circuit), including or not including a function of a related device, furthermore, the hardware section or unit can be constructed inside of a microcomputer.

Furthermore the software section or unit or any combinations of multiple software sections or units can be included in a software program, which can be contained in a non-transitory computer-readable storage media or can be downloaded via a communications network and then stored in a non-transitory computer-readable storage media.

Aspects of the disclosure described herein are set out in the following clauses.

As an aspect of the disclosure, a driving assistance apparatus for a vehicle is provided as follows. A grip state detection section is configured to detect a grip state of a steering wheel in a compartment of the vehicle. An image acquisition section is configured to acquire a captured image of the compartment that covers a possible action range of a person who is seated in a driver's seat. A position specification section is configured to specify, based on a captured image acquired by the image acquisition section, a position where a non-grip hand exists, the non-grip hand being a hand that is separate from the steering wheel, on condition that (i) the grip state of the steering wheel is in a hand-free state, in which at least either of two hands is separate from the steering wheel as a result of detecting of the grip state detection section, and (ii) a travel state of the vehicle is within a stipulated travel state, which is predetermined. A danger derivation section is configured to derive a danger degree such that the danger degree comes to have a greater value as a degree of a danger against driving of the vehicle becomes higher because the non-grip hand exists in a position specified by the position specification section. A warning section is configured to execute an output of a warning in a weaker state as the danger degree derived by the danger derivation section comes to have a smaller value.

As an optional aspect, the danger derivation section may classify several positions in the compartment in the vehicle based on danger degrees and define previously a low danger position within the positions classified, wherein when the non-grip hand exists in the low danger position, the danger degree has a value smaller than a reference value. Furthermore the danger derivation section may then derive the danger degree such that when the non-grip hand exists in the low danger position, the danger degree has a value smaller as compared with a case that the non-grip hand exists in a high danger position, which is within the positions classified in the compartment and is other than the low danger position.

According to the driving assistance apparatus, if the non-grip hand exists in the low danger position, the warning outputted from the warning section will become weak. Accordingly, the driver who puts the non-grip hand in the low danger position during performing the driving manipulation need not conscious of a warning outputted more than needs, and can maintain the concentration on the driving manipulation more certainly.

Further, the danger degree during driving the vehicle is decreased as the duration (i.e., time length) for which either hand is separate from the steering wheel becomes short.

Further, the danger derivation section may derive the danger degree such that the danger degree comes to have a smaller value as a non-grip hand existence duration for which the non-grip hand continues to exist in the low danger position becomes shorter.

According to the above driving assistance apparatus, the danger degree can be derived as a value adapted to the actual driving manipulation in the vehicle. As a result, the above configuration can reduce an output of a warning that may provide the driver with the sense of discomfort.

Further to the above configuration the danger derivation section may derive the danger degree such that when the non-grip hand existence duration relative to the low danger position where the non-grip hand exists is shorter than a predetermined value, the danger degree has a minimum value.

Thus, if the non-grip hand exists in the low danger position, the warning outputted from the warning section will become weakest. The driver can maintain the concentration on the driving manipulation more certainly. It is noted that the above predetermined value or time may be defined as a very short duration for which to confirm the fact that the non-grip hand existed in the low danger position (for example, 0.1 or less second).

As an optional aspect, the danger derivation section may derive the danger degree such that when the non-grip hand exists in the high danger position, the danger degree comes to have a greater value as a non-grip hand existence duration for which the non-grip hand continues to exist in the high danger position becomes longer.

That is, the warning outputted from the warning section may become stronger as the duration becomes longer, the duration for which the non-grip hand is separate from the steering wheel while existing in the high danger position providing the high degree of the danger against the driving manipulation.

Therefore, the driver of the vehicle can recognize more certainly the warning outputted based on the non-grip hand existing in the high danger position. Further, the danger derivation section may derive the danger degree such that the danger degree varies step-wise in proportion to the duration or time length for which the non-grip hand is existing in the high danger position.

The warning may be "audio data for sounding a warning message" according to the danger degree, for example. In this case, the above configuration can reduce the number of kinds of the audio data previously prepared.

As an optional aspect, the danger derivation section may derive the danger degree such that when the non-grip hand exists in the high danger position, the danger degree comes to have a greater value as the high danger position is farther away from the driver's seat.

That is, the warning outputted by the warning section becomes strong as the distance of the high danger position from the steering wheel becomes larger or farther. The driving assistance apparatus thus enables the driver to recognize that the danger degree increases as the necessity of moving the body of the driver becomes greater.

As an optional aspect, the high danger position may a position where a target object manipulated by the non-grip hand exists. Further, the danger derivation section may derive the danger degree such that when the non-grip hand exists in the high danger position, the danger degree comes to have a greater value as a duration for which the non-grip hand manipulates the target object in the high danger position and then grips the steering wheel is estimated to become longer.

That is, when manipulating the target object which exists in the position having higher danger degree, the warning outputted by the warning section becomes strong. Thereby, the driver of the vehicle can be made to recognize that the danger degree becomes greater, as a result of the driver's consciousness concentrating on the manipulation of the target object.

As an optional aspect, the high danger position may be a position where a target object manipulated by the non-grip hand exists. Further, the danger derivation section may derive the danger degree such that when the non-grip hand exists in the high danger position, the danger degree comes to have a greater value as a duration for which the driver moves a sight line away from a heading direction of the vehicle when manipulating the target object in the high danger position is estimated to become longer.

That is, when manipulating the target which exists in the position having higher danger degree, the warning outputted by the warning section becomes strong. Thereby, the driver of the vehicle can be made to recognize that the danger degree becomes greater, as a result of the driver's consciousness concentrating on the manipulation of the target object.

As an optional aspect, the position specification section may determine whether a position where the non-grip hand exists is the low danger position, and define a high danger position which is within the positions classified in the compartment and is determined not to be the low danger position.

According to such a configuration, the positions where the non grip hand may exist can be determined or defined as binary values, i.e., either the low danger position or the high danger position. Such a configuration can reduce an amount of processing for specifying a position of the non-grip hand.

As an optional aspect, the position specification section may define as the low danger position, at least one of (i) an armrest provided in the vehicle (ii) a window frame in the vehicle, and (iii) a driver's upper thigh.

This is because as follows. The driver of the vehicle may put the non-grip hand on the armrest or window frame provided in the vehicle, or driver's upper thigh during the driving manipulation. In such a case, while relaxing moderately, the driver of the vehicle still concentrates on the driving manipulation, thereby usually enabling the vehicle to be driven safely in many cases.

As an optional aspect, the warning section may prohibit an output of a warning when the danger degree derived by the danger derivation section is equal to or less than a predetermined value.

According to the above configuration an unnecessary warning may be more certainly prevented from being outputted during the driving manipulation.

As an optional aspect, the stipulated travel state may be a travel state where the hand-free state during driving of the vehicle is evitable.

In other words, in a travel state other than the stipulated travel state, the hand-free state during driving of the vehicle is inevitable or permitted. For instance, the travel state other than the stipulated travel state may include the following: the backward moving state where the subject vehicle is moved backwardly; the rotating state where the subject vehicle is rotated; the indispensable instrument manipulating state where an indispensable instrument is manipulated; the in-traffic congesting state where the subject vehicle is involved in the traffic congestion; and the slow speed state where the subject vehicle is in the low speed.

It will be obvious to those skilled in the art that various changes may be made in the above-described embodiments of the present invention. However, the scope of the present invention should be determined by the following claims.

What is claimed:

1. A driving assistance apparatus for a vehicle, comprising:
a grip state detection section configured to detect a grip state of a steering wheel in a compartment of the vehicle;
an image acquisition section configured to acquire a captured image of the compartment that covers a possible action range of a person who is seated in a driver's seat;
a position specification section configured to specify, based on a captured image acquired by the image acquisition section, a position where a non-grip hand exists, the non-grip hand being a hand that is separate from the steering wheel, on condition that (i) the grip state of the steering wheel is in a hand-free state, in which at least either of two hands is separate from the steering wheel as a result of detecting of the grip state detection section, and (ii) a travel state of the vehicle is within a stipulated travel state, which is predetermined;
a danger derivation section configured to derive a danger degree such that the danger degree comes to have a greater value as a degree of a danger against driving of the vehicle becomes higher because the non-grip hand exists in a position specified by the position specification section; and
a warning section configured to execute an output of a warning in a weaker state as the danger degree derived by the danger derivation section comes to have a smaller value,
wherein:
the danger derivation section
classifies a plurality of positions in the compartment in the vehicle based on danger degrees, and
defines previously a low danger position within the positions classified, wherein the danger degree has a value smaller than a reference value when the non-grip hand exists in the low danger position; and
the danger derivation section derives the danger degree such that when the non-grip hand exists in the low danger position, the danger degree has a value smaller as compared with a case that the non-grip hand exists in a high danger position, which is within the positions classified in the compartment and is other than the low danger position.

2. The driving assistance apparatus according to claim 1, wherein
the danger derivation section derives the danger degree such that the danger degree comes to have a smaller value as a non-grip hand existence duration for which the non-grip hand continues to exist in the low danger position becomes shorter.

3. The driving assistance apparatus according to claim 2, wherein
the danger derivation section derives the danger degree such that when the non-grip hand existence duration relative to the low danger position, where the non-grip hand exists, is shorter than a predetermined value, the danger degree has a minimum value.

4. The driving assistance apparatus according to claim 1, wherein
the danger derivation section derives the danger degree such that when the non-grip hand exists in the high danger position, the danger degree comes to have a greater value as a non-grip hand existence duration, for which the non-grip hand continues to exist in the high danger position, becomes longer.

5. The driving assistance apparatus according to claim 1, wherein
the danger derivation section derives the danger degree such that when the non-grip hand exists in the high danger position, the danger degree comes to have a greater value as the high danger position is farther away from the driver's seat.

6. The driving assistance apparatus according to claim 1, wherein:
the high danger position is a position, where a target object manipulated by the non-grip hand exists; and
the danger derivation section derives the danger degree such that when the non-grip hand exists in the high danger position, the danger degree comes to have a greater value as a duration, for which the non-grip hand manipulates the target object in the high danger position and then grips the steering wheel, is estimated to become longer.

7. The driving assistance apparatus according to claim 1, wherein:
the high danger position is a position where a target object manipulated by the non-grip hand exists; and
the danger derivation section derives the danger degree such that when the non-grip hand exists in the high danger position, the danger degree comes to have a greater value as a duration, for which the driver moves a sight line away from a heading direction of the vehicle when manipulating the target object in the high danger position, is estimated to become longer.

8. The driving assistance apparatus according to claim 1, wherein
the position specification section
determines whether a position where the non-grip hand exists is the low danger position, and defines a high danger position, which is within the positions classified in the compartment and is determined not to be the low danger position.

9. The driving assistance apparatus according to claim 1, wherein

The danger derivation section defines as the low danger position, at least one of (i) an armrest provided in the vehicle, (ii) a window frame in the vehicle, and (iii) a driver's upper thigh.

10. The driving assistance apparatus according to claim 1, wherein the warning section prohibits an output of a warning when the danger degree derived by the danger derivation section is equal to or less than a predetermined value.

11. The driving assistance apparatus according to claim 1, wherein the stipulated travel state includes a travel state where the hand-free state during driving of the vehicle is evitable.

12. A program product, stored in a non-transitory computer readable storage medium, comprising instructions for execution by a computer, the instructions including a computer-implemented method in a driving assistance apparatus for a vehicle for deriving a danger degree to warn against driving manipulation of the vehicle, the driving assistance apparatus including:

a grip state detection section configured to detect a grip state of a steering wheel in a compartment of the vehicle; and an image acquisition section configured to acquire a captured image of the compartment that covers a possible action range of a person who is seated in a driver's seat, the instructions for implementing the steps of:

specifying, based on a captured image acquired by the image acquisition section, a position where a non-grip hand exists, the non-grip hand being a hand that is separate from the steering wheel, on condition that (i) the grip state of the steering wheel is in a hand-free state, in which at least either of two hands is separate from the steering wheel as a result of detecting of the grip state detection section, and (ii) a travel state of the vehicle is within a stipulated travel state, which is predetermined;

deriving a danger degree such that the danger degree comes to have a greater value as a degree of a danger against driving of the vehicle becomes higher because the non-grip hand exists in the position specified; and executing an output of a warning in a weaker state as the danger degree derived comes to have a smaller value, wherein in the deriving step, a plurality of positions are classified in the compartment in the vehicle based on danger degrees, and a low danger position is defined previously within the classified positions, wherein the danger degree has a value smaller than a reference value when the non-grip hand exists in the low danger position; and in the deriving step, the danger degree is derived such that when the non-grip hand exists in the low danger position, the danger degree has a smaller value as compared with a case that the non-grip hand exists in a high danger position, which is within the positions classified in the compartment and is other than the low danger position.

* * * * *